United States Patent
Parker et al.

[11] Patent Number: 5,836,598
[45] Date of Patent: Nov. 17, 1998

[54] APPARATUS FOR VEHICLE SUSPENSION STABILIZATION SYSTEM AND METHOD THEREOF

[75] Inventors: Eric G. Parker, Chicago; Robert K. Dutzi, Buffalo Grove, both of Ill.

[73] Assignee: Illinois Tool Works Inc., Glenview, Ill.

[21] Appl. No.: 798,875

[22] Filed: Feb. 11, 1997

[51] Int. Cl.⁶ .................................................. B60G 3/02
[52] U.S. Cl. ................... 280/93.51; 280/124.11; 280/124.111; 280/124.125; 280/124.152; 280/124.106
[58] Field of Search ........................ 280/124.11, 124.111, 280/93.51, 124.125, 124.152, 124.106

[56] References Cited

U.S. PATENT DOCUMENTS

| | | | |
|---|---|---|---|
| 4,071,259 | 1/1978 | Ernest | 280/95 R |
| 4,546,997 | 10/1985 | Smyers | 280/772 |
| 4,557,501 | 12/1985 | Farleigh | 280/673 |
| 4,822,073 | 4/1989 | Tanahashi et al. | 280/673 |
| 5,062,656 | 11/1991 | Hynds et al. | 280/689 |
| 5,382,034 | 1/1995 | Parker et al. | 280/104 |
| 5,449,193 | 9/1995 | Rivard et al. | 280/689 |
| 5,542,705 | 8/1996 | Parket et al. | 280/772 |
| 5,707,073 | 1/1998 | Stuker et al. | 280/124.124 |

*Primary Examiner*—J. Woodrow Eldred

[57] ABSTRACT

A stabilization member usable for coupling first and second pivotal suspension components in a vehicle suspension stabilization system. The stabilization member includes first and second tension members each having a substantially U-shaped closed first end portion linked together to form a cavity for retaining a resilient dampening member, and a second end portion coupleable to one of the first and second pivotal suspension components, whereby tension on the first and second tension members is at least partially absorbable by compression of the resilient dampening member. In one embodiment, the substantially U-shaped closed first end portions of the first and second tension members is a strap material, which are oriented substantially perpendicular to form the link, and the resilient dampening member is a thermoset urethane material, which may be pre-compressed to permit adjustably tuning the suspension stabilization system. The stabilization members provide improved suspension performance, decreased weight and cost, among other advantages.

11 Claims, 2 Drawing Sheets

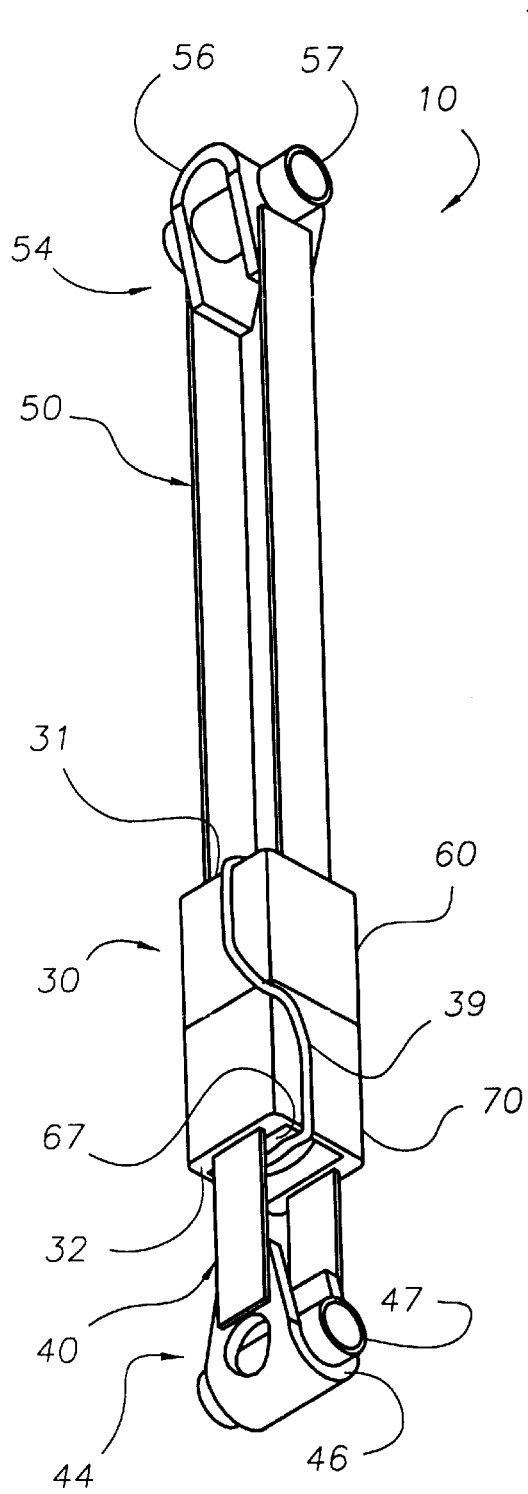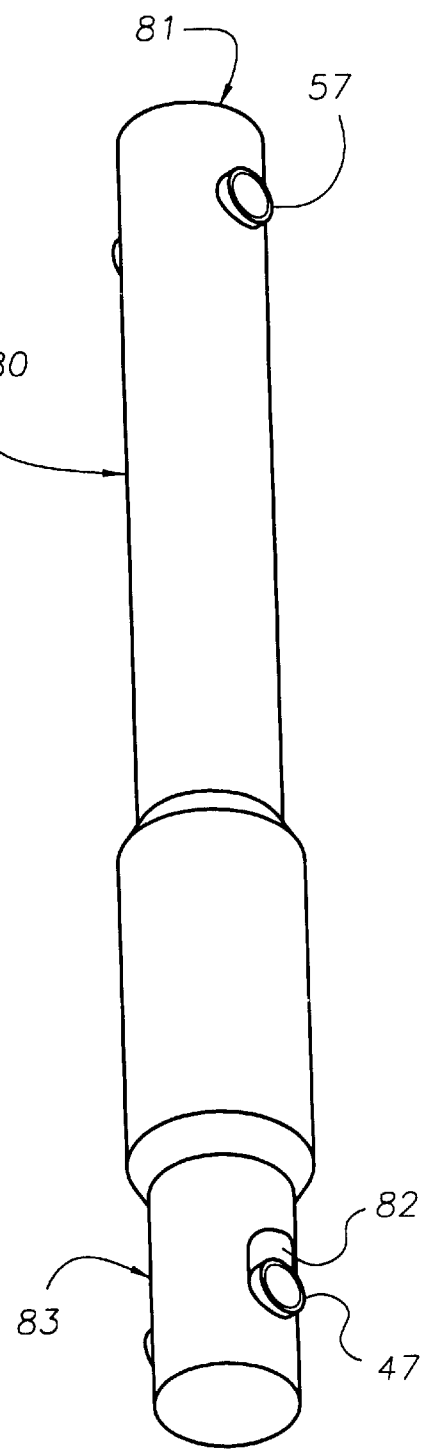

APPARATUS FOR VEHICLE SUSPENSION STABILIZATION SYSTEM AND METHOD THEREOF

CROSS-REFERENCE TO RELATED APPLICATIONS

The present application is related to copending U.S. application Ser. No. 08/689,881, filed 15 Aug. 1996 entitled "Direct Pull Dual Compensating Stabilizer System", commonly assigned and incorporated by reference herein.

BACKGROUND OF THE INVENTION

The invention relates generally to vehicle suspension stabilization systems, and more particularly to stabilizing members usable for coupling first and second pivotable suspension components of vehicle suspension systems and methods therefor.

Recent advances in vehicle suspension systems have proposed replacement, in some applications, of conventional torsion type anti-roll, or stabilizer bars, with lighter weight components that more effectively reduce body roll and provide other advantages. U.S. Pat. No. 5,382,034 entitled "Dual Compensating Stabilizer" issued 17 Jan. 1995 to Parker et al. and commonly assigned herewith, for example, discloses a vehicle suspension stabilization system including an arrangement of crossed flexible tension members interconnecting opposing pivotal suspension components for indirectly transferring energy through the vehicle frame and therebetween to substantially reduce body roll and to substantially isolating shock loads imparted to the individual pivotal suspension components. The flexible tension members are also adjustably pre-loadable to provide improved suspension tuning, and reduce remarkably space utilization, weight and cost of vehicle suspension stabilization systems.

In a similar vein, commonly assigned U.S. application Ser. No. 08/689,881, filed 15 Aug. 1996, entitled "Direct Pull Dual Compensating Stabilizer System", and incorporated by reference herein discloses a vehicle suspension stabilization system including an arrangement of crossed tension members interconnecting opposing pivotal suspension components to transfer indirectly energy therebetween without transferring energy through the vehicle frame. The system of U.S. application Ser. No. 08/689,881 provides improved vehicle body roll and vehicle dive and lift, or pitch, control in addition to the many advantages provided by U.S. Pat. No. 5,382,034, some of which are discussed above, thereby reducing oversteer and understeer and more generally improving overall vehicle handling performance.

An object of the present invention is to provide novel stabilizing members usable for coupling first and second pivotal suspension components in a vehicle suspension stabilization system and methods therefor.

It is also an object of the invention to provide novel stabilizing members and methods therefor that are relatively lightweight and less costly, and utilize relatively reduced space in vehicle suspension systems applications.

It is another object of the invention to provide novel stabilizing members usable for coupling first and second pivotal suspension components in a vehicle suspension stabilization system and methods therefor, which thereby reduce vehicle roll and pitch, isolate shock loads imparted to individual pivotal suspension components, and improved vehicle handling performance.

It is a further object of the invention to provide novel stabilizing members usable for directly coupling first and second pivotal suspension components in a vehicle suspension stabilization system and which are adjustably pre-loadable to provide improved suspension tuning.

It is another object of the invention to provide novel stabilizing members at least partially sealed in an encasement member and usable for coupling first and second pivotal suspension components in a vehicle suspension stabilization system.

It is a further object of the invention to provide a novel stabilizing member comprising first and second tension members having substantially U-shaped closed end portions linked together to form a cavity therebetween for receiving a compressible dampening member, which at least partially absorbs tension applied to the first and second tension members, wherein plural stabilizing members are usable for directly coupling first and second pivotal suspension components in a vehicle suspension stabilization system.

These and other objects, features and advantages of the present invention will become more fully apparent upon consideration of the following Detailed Description of the Invention with the accompanying Drawings, which may be disproportionate for ease of understanding, wherein like structure and steps are referenced by corresponding numerals and indicators.

BRIEF DESCRIPTION OF THE DRAWINGS

FIG. 1 is a perspective view of a stabilization member usable in a vehicle suspension stabilization system according to an exemplary embodiment of the invention.

FIG. 2 is a perspective view of a stabilization member in a sealed encasement according to an exemplary embodiment of the invention.

FIG. 6b is a sectional view taken along lines I—I of FIG. 6a.

FIG. 6c is an end view of FIG. 6a.

DETAILED DESCRIPTION OF THE INVENTION

Figure 3:
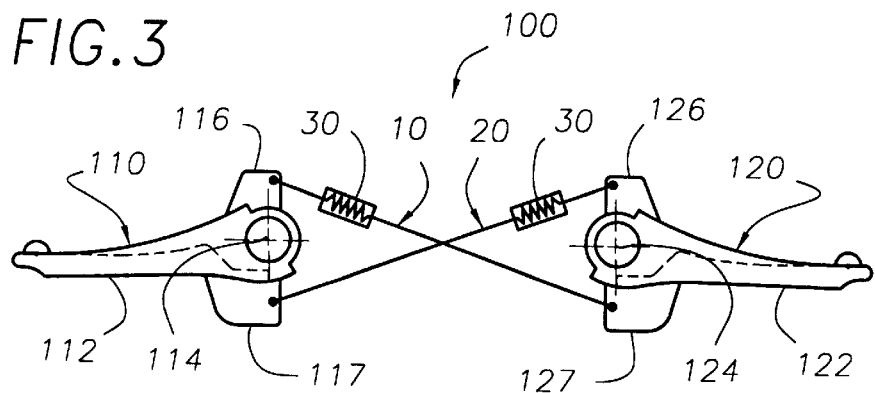
FIG. 3 is a partial side view of a vehicle suspension stabilization system according to an exemplary embodiment of the invention.

FIG. 1 is a perspective view of a stabilization member 10 according to an exemplary embodiment of the invention, and FIG. 2 is a perspective view of a stabilization member 10 sealed in an encasement member as discussed further below. The stabilization members 10 of the type discussed herein are usable generally in vehicle suspension stabilization systems. FIG. 3 illustrates an exemplary vehicle suspension stabilization system configuration 100 including first and second pivotal suspension components 110 and 120 coupled by crossed first and second stabilization members 10 and 20. In the exemplary embodiment, the pivotal suspension components 110 and 120 are control arms 112 and 122 pivotal about corresponding axes 114 and 124 and including corresponding upper linking members, or upper anchors, 116 and 126 disposed on one side of the corresponding axes 114 and 124 and corresponding lower anchors 116 and 127 disposed on another side of the corresponding axes 114 and 124, wherein the stabilization members 10 and 20 are coupled to the upper and lower anchors. The pivotal suspension components 110 and 120 may be more generally other pivotal components of a vehicle suspension system and the anchors may be configured alternatively for different suspension stabilizing effects as discussed more fully in the copending U.S. application Ser. No. 08/689,881, filed 15 Aug. 1996 entitled "Direct Pull Dual Compensating Stabilizer System" incorporated by reference herein.

Figure 4:
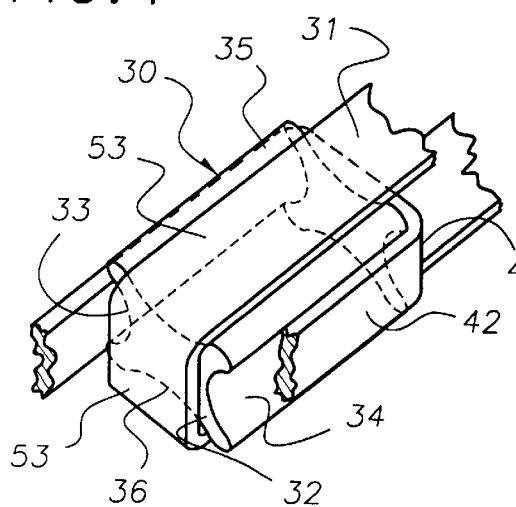
FIG. 4 is a partial perspective view of a resilient dampening member and assembly configuration for a stabilization member according to an exemplary embodiment of the invention.

FIGS. 1 and 4 show the stabilization member 10 comprising generally a resilient dampening member 30, and first and second tension members 40 and 50 having corresponding substantially U-shaped closed first end portions 42 and 52 coupled to the dampening member 30. A corresponding second end portion 44 and 52 of the first and second tension members 40 and 50 are coupleable to a one of the corresponding first and second pivotal suspension components 110 and 120 as shown in FIG. 3 and discussed further below. The substantially U-shaped first end portion 42 of the first tension member 40 is linked with the substantially U-shaped first end portion 52 of the second tension member 50, and the resilient dampening member 30 is retained in a cavity therebetween, whereby tension on the first and second tension members 40 and 50 is at least partially absorbable by compression of the resilient dampening member 30 between the substantially U-shaped closed end portions 42 and 52 of the first and second tension members 40 and 50.

In the exemplary embodiments, the substantially U-shaped closed end portions 42 and 52 are strap material, which may be a metal or synthetic or composite strap material and is available generally. Alternative embodiments, however, may comprise other materials, including flexible cable or a substantially rigid material, which are linkably formable in substantially U-shaped closed end portions to retain therebetween the resilient dampening member 30. FIG. 4 shows the substantially U-shaped closed end portion 42 of the first tension member 40 oriented substantially perpendicular relative to the substantially U-shaped closed end portion 52 of the second tension member 50. According to this aspect of the invention, the substantially perpendicular orientation of the substantially U-shaped closed end portions 42 and 52 is considered to be any angular orientation which permits linking of the first and second tension members 40 and 50. Thus for linked strap material tension members this range of permissible angles may not be as great as for linked cable material tension members.

Figure 5:
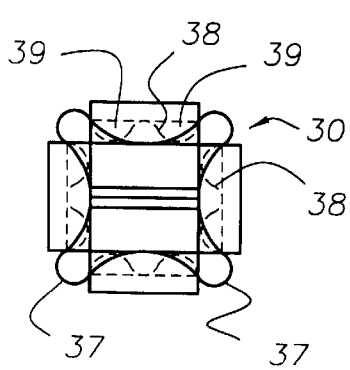
FIG. 5 is an end view of FIG. 4, and illustrates also an alternative resilient damping member configuration.

FIGS. 1, 4 and 5 show the resilient dampening member 30 comprised of a compressible, resilient rubber-like material including neoprene and, particularly, thermoset urethane materials. FIGS. 4 and 5 shows the resilient dampening member 30 having first and second substantially opposing ends 31 and 32, first substantially opposing side 33 and 34, and second substantially opposing sides 35 and 36. The first and second side portions 33, 34, 35 and 36 are each separated by intermediate protruding portions 37. According to this aspect of the invention, the substantially U-shaped closed end portion 42 is disposed about the first end 31 and first sides 33 and 34, and the substantially U-shaped closed end portion 52 is disposed about the second end 32 and second sides 35 and 36, wherein the intermediate protruding portions 37 of the resilient dampening member 30 disposed therebetween align and orient substantially perpendicularly the substantially U-shaped closed end portions 42 and 52 of the tension members 40 and 50. FIG. 5 also shows the resilient dampening member 30 having protruding ridges 38, or recesses 39, disposed along the first and second sides to alter its resilient characteristics, which are application dependant.

FIGS. 1 shows the resilient dampening member 30 comprising two compressible, resilient rubber-like material components 60 and 70 arranged end to end between the substantially U-shaped closed end portions 42 and 52. The utilization of a plurality of at least two resilient dampening members arranged side by side to compose the resilient dampening member 30 results in improved performance of the resilient dampening member, including prolonged lifetime and decreased loss of resiliency, particularly some of the compressible, rubber-like materials. The resilient dampening member 30 of FIG. 4 may be comprised similarly of an end to end arrangement of plural components between the substantially U-shaped closed first end portions 42 and 52.

Figure 6A:
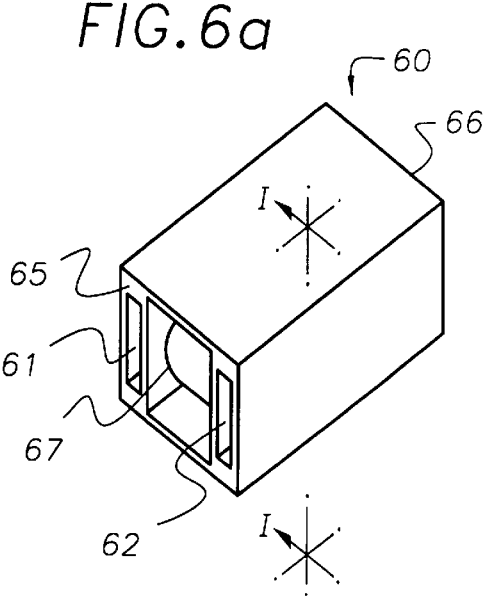
FIG. 6a is a partial perspective view of a resilient damping member for a stabilization member according to another exemplary embodiment of the invention.
Figure 6B:
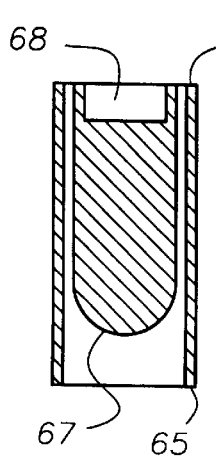
Figure 6C:
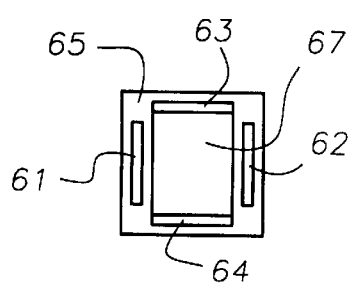

FIGS. 6a–6c show one of two substantially identical components 60 and 70 that compose the resilient dampening member 30 in the exemplary embodiment of FIG. 1. Each component 60 has a first pair of passages 61 and 62 and a second pair of passages 63 and 64 extending through the component 60 from a first end 65 to a second end 66. According to this aspect of the invention, the components 60 and 70 are arranged end to end so that the respective first and second passages are in alignment, wherein the substantially U-shaped closed first end portion 42 of the first tension member 40 is disposed through the first pair of passages and about one end of the resilient dampening member 30, and the substantially U-shaped closed first end portion 52 of the second tension member 50 is disposed through the second pair of passages and about the other opposing end of the resilient dampening member 30. The first and second pairs of passages 61, 62 and 63, 64 positively restrain and align the linked substantially perpendicular substantially U-shaped closed end portions 42 and 52. The resilient dampening member 30 of the configuration shown in FIG. 1 may alternatively be comprised of a unitary member rather than from a plurality of components as discussed above.

According to another aspect of the invention shown in FIG. 1, the first and second ends 31 and 32 of the resilient dampening member 30 have a curved portion 67 about which the substantially U-shaped closed end portions 42 and 52 are disposed. In the exemplary embodiment of FIG. 6, wherein the resilient dampening member 30 is comprised of two components, the curved portion 67 is located on the end 65. According to this aspect of the invention, the components 60 and 70 are arranged end to end so that the curved portions 67 of the components 60 and 70 are located at opposing outer ends, which correspond to ends 31 and 32 of the resilient dampening member 30, wherein the curved portions 67 are oriented perpendicular to each other thereby permitting linking of the tension members 40 and 50. According to a related aspect of the invention, the linked substantially U-shaped closed first end portions 42 and 52 of the tension members 40 and 50 are substantially frictionlessly slidable relative to each other and relative to the resilient dampening member 30 when the tension members 40 and 50 are in compression. And according to still another related aspect of the invention, the curved portions 67 are recessed relative to the corresponding ends 65 so that the ends 43 and 53 of the substantially U-shaped closed end portions 42 and 52 do not protrude beyond the ends 31 and 33 of the resilient dampening member 30 during compression of the tension members 40 and 50.

According to another aspect of the invention, the resilient dampening member 30 is pre-compressible, or pre-loadable, to vary the dampening characteristic of the stabilizing member 10. According to one embodiment, a clamp, for example a close-ended flexible band member not shown, is disposed about the resilient dampening member 30 to pre-compress the resilient dampening member, and in another configuration, one or more S-shaped clamp members 39 is disposed over the opposing ends 31 and 32 of the resilient dampening member 30 as shown in FIG. 1. More generally, the resilient dampening member 30 may be a spring member including one or more conventional coil springs having rounded or flattened outer surfaces to facilitate retaining and orienting the substantially U-shaped closed first end portions 42 and 52, and which may be pre-compressed also.

According to yet another aspect of the invention shown in FIG. 6b, the ends 66 of the adjacent components 60 and 70 may include a recess 68 for receiving therebetween an intermediate resilient member, not shown, having a different dampening characteristic. The resilient dampening member 30 may thus have different dampening characteristics in response to tension applied to the tension members 40 and 50 depending on the degree of tension applied to the stabilizing member 10. The intermediate resilient member may be a resilient, compressible rubber-like material, or a more conventional coil spring member.

FIG. 1 shows the second end portions 44 and 54 of the tension members 40 and 50 also comprising strap material, but these portions second end portions 44 and 54 of the tension members 40 and 50 may have alternative configurations including a single connecting member formed and may be formed of other materials including flexible cable or a rigid material. The second end portions 44 and 54 also include coupling members 46 and 56, which in the exemplary embodiment have bushings 47 and 57, for pivotally coupling the stabilizing member 10 to the pivotal suspension components 110 and 120. The second end portions 44 and 54 may alternatively have clevis members for pivotally coupling the stabilizing member 10 to the pivotal suspension components 110 and 120.

According to still another aspect of the invention shown in FIG. 2, an encasement member 80 is disposed about and sealingly encases at least the substantially U-shaped closed first end portion 42 of the first tension member 40, the substantially U-shaped closed first end portion 52 of the second tension member 50, and the resilient dampening member 30. In the exemplary embodiment of FIG. 2, the encasement member 80 extends between and encases the ends 44 and 54 of the stabilizing member 10. The bushings 47 and 57 however remain at least partially exposed to permit coupling the stabilizing member 10 to the pivotal suspension components 110 and 120. According to a related aspect of the invention, one end of the encasement 80 includes a recess or opening 82 that forms a seat to permit the bushing 47 to move inwardly and outwardly relative to the resilient dampening member 30 and the coupling member 46 when the stabilizing member 10 is under compression and tension. This configuration may be used alternatively or cumulatively with other compression responding features discussed herein.

In one embodiment, the encasement member 80 is a closed cell foam material, which protects the stabilizing member 10 from the environment, reduces vibratory noise and reduces the possibility of interference with foreign objects. In one embodiment, only the end portions 81 and 83 of the encasement member 80 are sealingly adhered to the stabilizing member 10 to permit unrestricted compression and expansion of the resilient dampening member 30 under tension and compression as discussed above. According to this aspect of the invention, intermediate portions, exclusive of the end portions, of the stabilizing member 10 are treated with a release agent, for example, a silicon type lubricating agent, which prevents adherence of the encasement member material thereto. According a related aspect of the invention, the encasement member 80 is formed about the stabilizing member 10 when the stabilizing member is under tension, which may occur during weld inspection. And according to another related aspect of the invention, the encasement member 80 has a ribbed configuration to facilitate expansion and compression thereof.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A stabilization member useable for coupling first and second pivotal suspension components in a vehicle suspension stabilization system, the stabilization member comprising:

a resilient dampening member;

a first tension member having a substantially U-shaped closed first end portion coupled to the resilient dampening member and a second end portion coupleable to one of the first and second pivotal suspension components;

a second tensioning member having a substantially U-shaped closed first end portion coupled to the resilient dampening member and a second end portion coupleable to the other of the first and second pivotal suspension components;

the substantially U-shaped closed first end portion of the first tension member linked with the substantially U-shaped closed first end portion of the second tension member, and the resilient dampening member retained in a cavity between the substantially U-shaped closed first end portion of the first tension member and the substantially U-shaped closed first end portion of the second tension member, whereby tension on the first and second tension members is at least partially absorbable by compression of the resilient dampening member.

2. The stabilization member of claim 1, the substantially U-shaped closed first end portions of the first and second tension members is a strap material, the substantially U-shaped closed first end portion of the first tension member oriented substantially perpendicular relative to the substantially U-shaped closed first end portion of the second tension member.

3. The stabilization member of claim 1, the resilient dampening member is a urethane material.

4. The stabilization member of claim 1, the resilient dampening member has side portions separated by intermediate protruding portions, whereby the protruding portions configure the substantially U-shaped closed first end portion of the first tension member at substantially perpendicular relative to the substantially U-shaped closed first end portion of the second tension member.

5. The stabilization member of claim 1 further comprising:

a first pair of passages extending through the resilient dampening member from a first end of the resilient dampening member to a second end of the resilient dampening member, the first pair of passages disposed toward substantially opposing first side portions of the resilient dampening member;

a second pair of passages extending through the resilient dampening member from the second end of the resilient dampening member to the first end of the resilient dampening member, the second pair of passages disposed toward substantially opposing second side portions of the resilient dampening member, the substantially U-shaped closed first end portion of the first tension member disposed through the first pair of passages and about the first end of the resilient dampening member, and the substantially U-shaped closed first end portion of the second tension member disposed through the second pair of passages and about the second end of the resilient dampening member, the substantially U-shaped closed first end portion of the first tension member oriented substantially perpendicular relative to the substantially U-shaped closed first end portion of the second tension member.

6. The stabilization member of claim 1, the resilient dampening member comprising a plurality of at least two resilient dampening members arranged end to end between the substantially U-shaped closed first end portion of the first tension member and the substantially U-shaped closed first end portion of the second tension member.

7. The stabilization member of claim 1, further comprising an encasement member disposed about and sealingly encasing at least the substantially U-shaped closed first end portion of the first tension member, the substantially U-shaped closed first end portion of the second tension member, and the resilient dampening member.

8. The stabilization member of claim 7, the encasement member is a closed cell foam material sealingly adhered to a portion of the first tension member and sealingly adhered to a portion of the second tension member.

9. The stabilization member of claim 1 further comprising a clamp disposed about a first end and a second end of the resilient dampening member to compressibly pre-load the resilient dampening member.

10. A method of coupling first and second pivotal suspension components in a vehicle suspension stabilization system, the method comprising steps of:

coupling a second end portion of a first tension member to one of the first and second pivotal suspension components;

coupling a second end portion of a second tension member to the other of the first and second pivotal suspension components;

linking a substantially U-shaped closed first end portion of the first tension member with a substantially U-shaped closed first end portion of the second tension member to form a cavity;

retaining a resilient dampening member in the cavity formed by the substantially U-shaped closed first end portion of the first tension member and the substantially U-shaped closed first end portion of the second tension member;

at least partially absorbing tension applied to the first and second tension members by compressing the resilient dampening member.

11. The method of claim 10 further comprising steps of increasing the cavity formed by the substantially U-shaped closed first end portion of the first tension member and the substantially U-shaped closed first end portion of the second tension member when the first and second members are under compression.

* * * * *